United States Patent [19]

Muramatsu

[11] Patent Number: 5,531,289
[45] Date of Patent: Jul. 2, 1996

[54] REAR ARM PIVOT STRUCTURE FOR MOTORCYCLE

[75] Inventor: Takayoshi Muramatsu, Iwata, Japan

[73] Assignee: Yamaha Hatsudoki Kabushiki Kaisha, Iwata, Japan

[21] Appl. No.: 401,659

[22] Filed: Mar. 10, 1995

Related U.S. Application Data

[63] Continuation of Ser. No. 124,841, Sep. 21, 1993, abandoned, which is a continuation of Ser. No. 773,514, Oct. 9, 1991, abandoned.

[51] Int. Cl.$^6$ ................................................ B62K 11/02
[52] U.S. Cl. .............................. 180/227; 180/219; 280/284
[58] Field of Search .................................. 180/219, 227, 180/231; 280/284, 285, 288, 275

[56] References Cited

U.S. PATENT DOCUMENTS

| | | | |
|---|---|---|---|
| 2,705,154 | 3/1955 | Torre | 280/284 |
| 4,114,918 | 9/1978 | Lutz | 280/284 |
| 4,550,794 | 11/1985 | Inoue et al. | 180/219 |
| 4,671,375 | 6/1987 | Oike et al. | 180/227 |
| 4,744,434 | 5/1988 | Miyakoshi et al. | 180/219 |
| 4,744,579 | 5/1988 | Roatta | 180/219 |
| 4,765,431 | 8/1988 | Yoshioka | 180/227 |
| 5,050,699 | 9/1991 | Savard | 180/219 |

FOREIGN PATENT DOCUMENTS

| | | | |
|---|---|---|---|
| 2480699 | 10/1981 | France | 180/231 |
| 0413537 | 5/1946 | Italy | 180/227 |

Primary Examiner—Anne Marie Boehler
Attorney, Agent, or Firm—Knobbe, Martens, Olson & Bear

[57] ABSTRACT

A motorcycle frame and trailing arm construction for providing a extremely high strength, light weight assembly. The frame is comprised of a head pipe and a pair of downwardly and rearwardly extending main frame members the center of which substantially intersect a pivot axis for a trailing arm that supports the motorcycle rear wheel. The trailing arm has a triangular configuration in side elevation and the rear suspension element is loaded by the thickest portion of the trailing arm so as to provide high strength. A bearing arrangement is incorporated for the trailing arm that permits removal of the driving sprocket that is concealed behind the trailing arm for servicing.

11 Claims, 7 Drawing Sheets

REAR ARM PIVOT STRUCTURE FOR MOTORCYCLE

This application is a a continuation of application Ser. No. 08/124,841, filed Sep. 21, 1993, now abandoned. Which is a continuation of application Ser. No. 07/773,514 filed Oct. 9, 1991 now abandoned.

BACKGROUND OF THE INVENTION

This invention relates to a rear arm pivot structure for a motorcycle and more particularly to an improved motorcycle frame and rear wheel suspension thereof.

The importance of providing a light weight, compact and yet high strength frame and suspension arrangement for a motorcycle are well known. These problems are particularly acute due to the high stresses under which motorcycles may be driven, particularly in such activities as moto-crossing or the like.

One popular form of suspension for the rear wheel of the motorcycle employs a trailing arm that is pivotally supported at its forward end by a lower rear portion of the frame and which carries the rear wheel at its rear end. Substantially all of the suspension loadings for the rear wheel are transferred to the frame through this rear pivot joint. Obviously, therefore, the rear pivot joint must be capable of withstanding high loads and with previous motorcycle constructions, this has been difficult.

In addition, to these problems, it is also desirable, when utilizing a chain drive for driving the rear wheel, to have the axis of rotation of the driving sprocket be aligned with the pivot axis of the trailing arm. By so orienting the drive sprocket and the pivot arm axis, the effect of change of length of the driving chain during suspension travel can be minimized. However, such a location then requires a rather wide frame arrangement at the lower end and this is clearly undesirable.

Furthermore, when the drive for the rear wheel is positioned coincident with or close to the pivot axis of the rear wheel trailing arm, then servicing of the drive arrangement and specifically the driving sprocket and chain can be difficult.

It is, therefore, a principal object to this invention to provide an improved frame and trailing arm construction for a motorcycle that will have high strength, compact construction and yet will afford ease of serviceability.

It is a further object to this invention to provide an improved frame structure for a motorcycle embodying a trailing arm suspension wherein the frame is constructed in such a way that the loading of the rear wheel on the frame will be well absorbed.

It is a still further object to this invention to provide a rear wheel trailing arm suspension arrangement for a motorcycle wherein servicing of the components associated with the drive of the rear wheel can be facilitated.

In connection with one popular form of rear wheel trailing arm suspension, loads are transferred from the trailing arm to the suspension element of the rear wheel through a linkage system that is connected to the trailing arm between its pivot point and the point of journal for the rear wheel. As such, bending loads are applied to the trailing arm which can cause deflection and/or permanent damage. If, however, the trailing arm is made strong enough to absorb all of these loads and have a generally uniform configuration, then the total trailing arm weight becomes excessive.

It is, therefore, a still further object to this invention to provide an improved trailing arm arrangement for the rear wheel of a motorcycle that is light in weight and yet high in strength.

SUMMARY OF THE INVENTION

A first feature of this invention is adapted to be embodied in a motorcycle construction comprised of a frame assembly comprised of a head pipe and a pair of main frame members that are joined at their forward ends to the head pipe and which extend generally downwardly and rearwardly therefrom in a line defining an inclined center line. A front fork rotatably journaling a front wheel is dirigibly supported by the head pipe. The main frame members having means defining a pivot axis at their rear lower ends that lie substantially on the center line. A trailing arm is pivotally journalled at the pivot axis and rotatably journals a rear wheel.

Another feature of the invention is adapted to be embodied in a trailing arm structure for the rear wheel of a motorcycle wherein the trailing arm has a forward pivot point for pivotal connection to the frame and rotatably journals a rear wheel at its rear end. A linkage system is interconnected to the trailing arm between its end for loading a suspension element upon pivotal movement of the rear arm. In accordance with this feature of the invention, the trailing arm has a triangular configuration in side elevation view with the height of the triangle being juxtaposed to the point of pivotal connection to the linkage system for providing high strength and light weight.

DETAILED DESCRIPTION OF THE PREFERRED EMBODIMENT OF THE INVENTION

Figure 1:
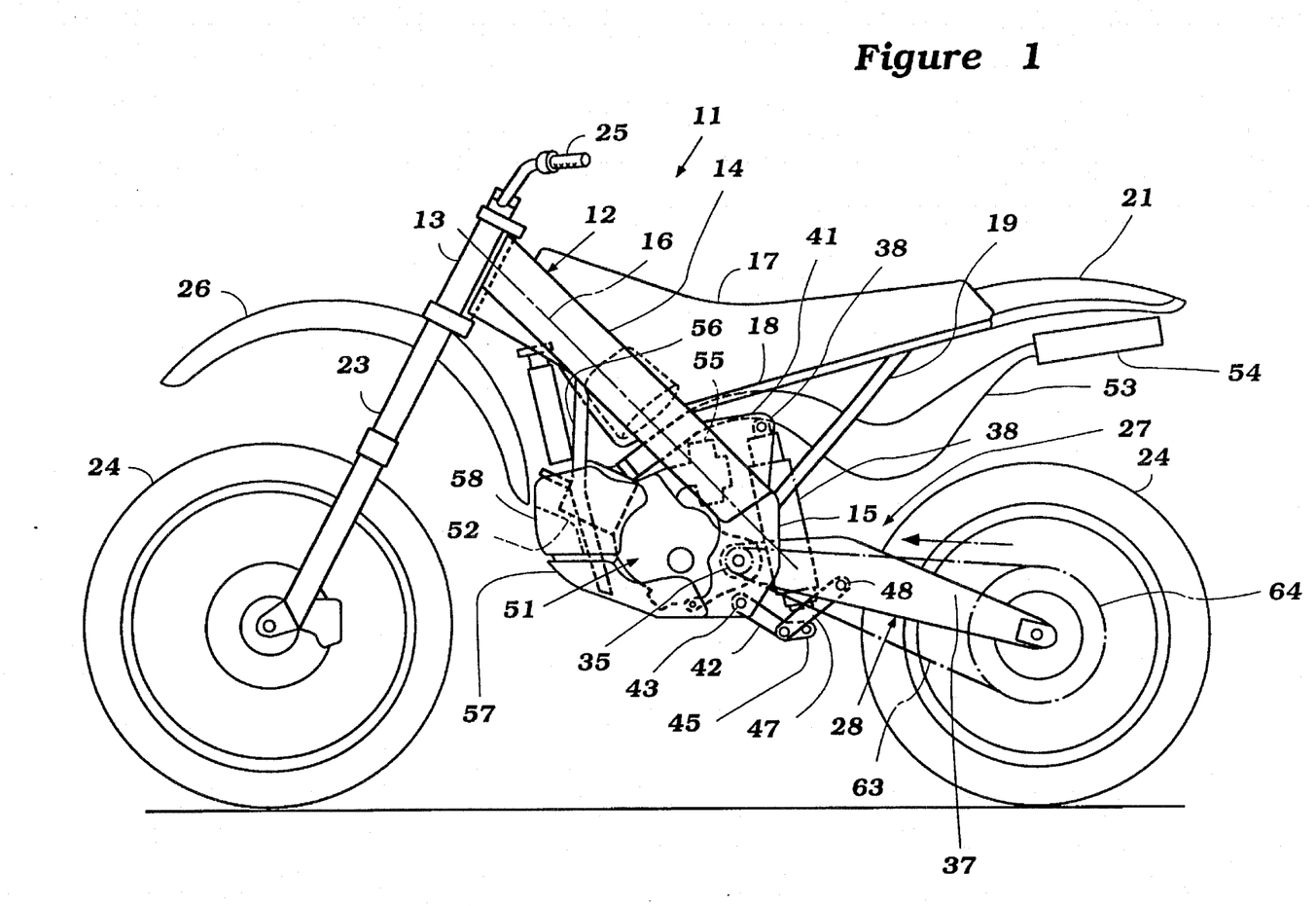
FIG. 1 is a side elevational view of a motorcycle constructed in accordance with an embodiment of the invention.

Referring first primarily to FIG. 1, a motorcycle having a frame and rear wheel suspension system constructed in accordance with an embodiment of the invention is identified generally by the reference numeral 11. The motorcycle 11 is depicted as being of the moto-crosser type because the invention has particular utility in connection with such motorcycles because they require light weight and high strength due to the rugged use they encounter. Of course, it should be readily apparent to those skilled in the art that the invention can be employed in conjunction with motorcycles of other types.

The motorcycle 11 includes a frame assembly, indicated generally by the reference numeral 12 which is comprised of a head pipe 13 and a pair of side main frame members 14 which may be formed as aluminum extrusions or fabrications and which extend downwardly and rearwardly from the head pipe 13 and which terminate at their lower ends at a fabrication 15 which provides a support, to be described, for a rear wheel of the motorcycle. The main frame members 14 have longitudinal center lines 16 which also extend downwardly and rearwardly and the significance of this will also be described later in conjunction with the suspension system for the rear wheel.

A seat 17 is suspended on the frame assembly 12 and specifically upon a pair of rearwardly extending seat rails 18 that are affixed to the main frame members 14 and extend rearwardly and upwardly therefrom. The rear ends of the seat rails 18 are supported by seat pillars 19 that are affixed to the fabrication 15. Rearwardly of the seat 17, there is provided a rear fender 21 which overlies a rear wheel 22.

The head pipe 13 dirigibly supports a front fork assembly 23 that rotatably journals a front wheel 24 at the lower end thereof. A handle bar assembly 25 is provided for steering the front wheel 24 and fork 23 and a fender 26 overlies the front wheel 24. The front fork 23 may embody any form of tubular shock and spring arrangement for accommodating suspension movement of the front wheel 24 relative to the frame assembly 12.

Figure 2:
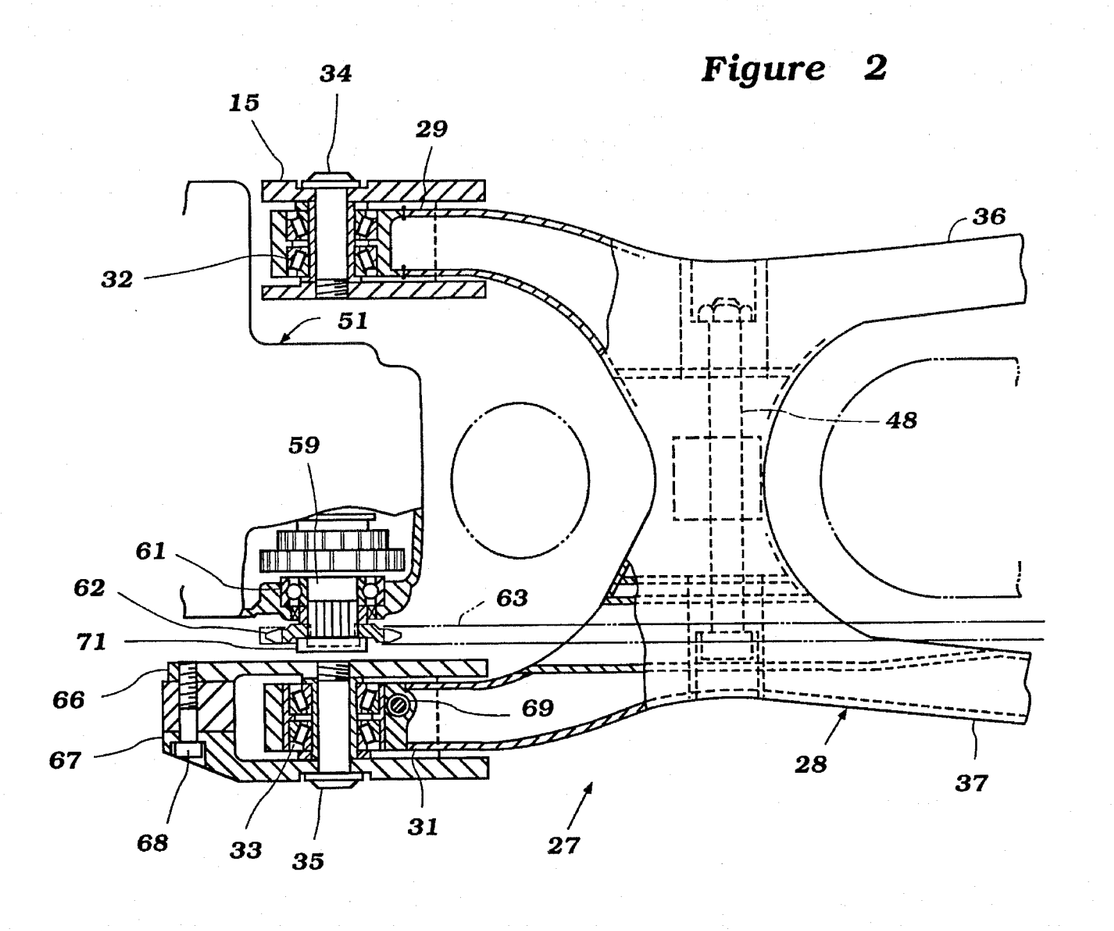
FIG. 2 is a top plan view of the trailing arm construction for the motorcycle, with portions broken away and shown in section.
Figure 3:
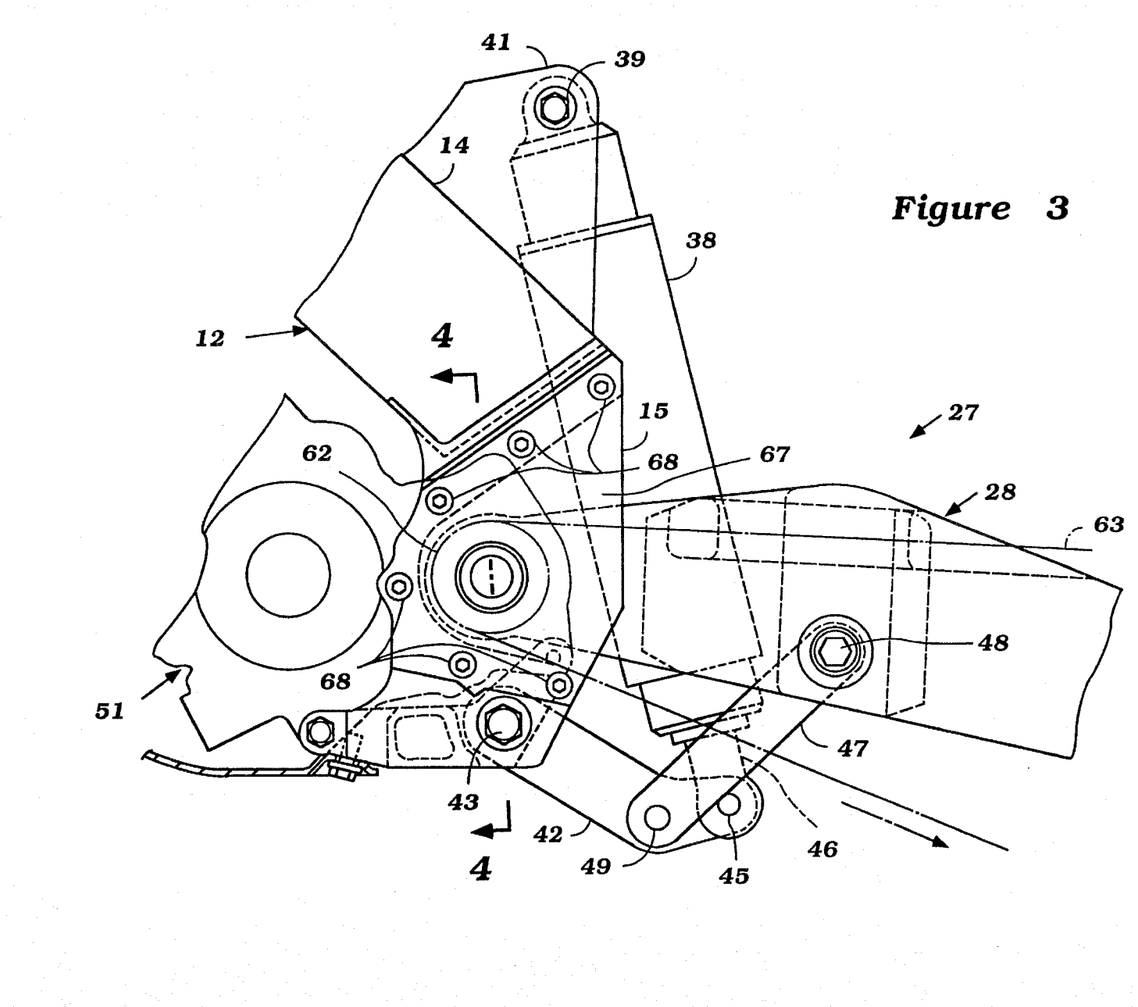
FIG. 3 is an enlarged side elevational view of the area of the motorcycle shown in FIG. 2.
Figure 4:
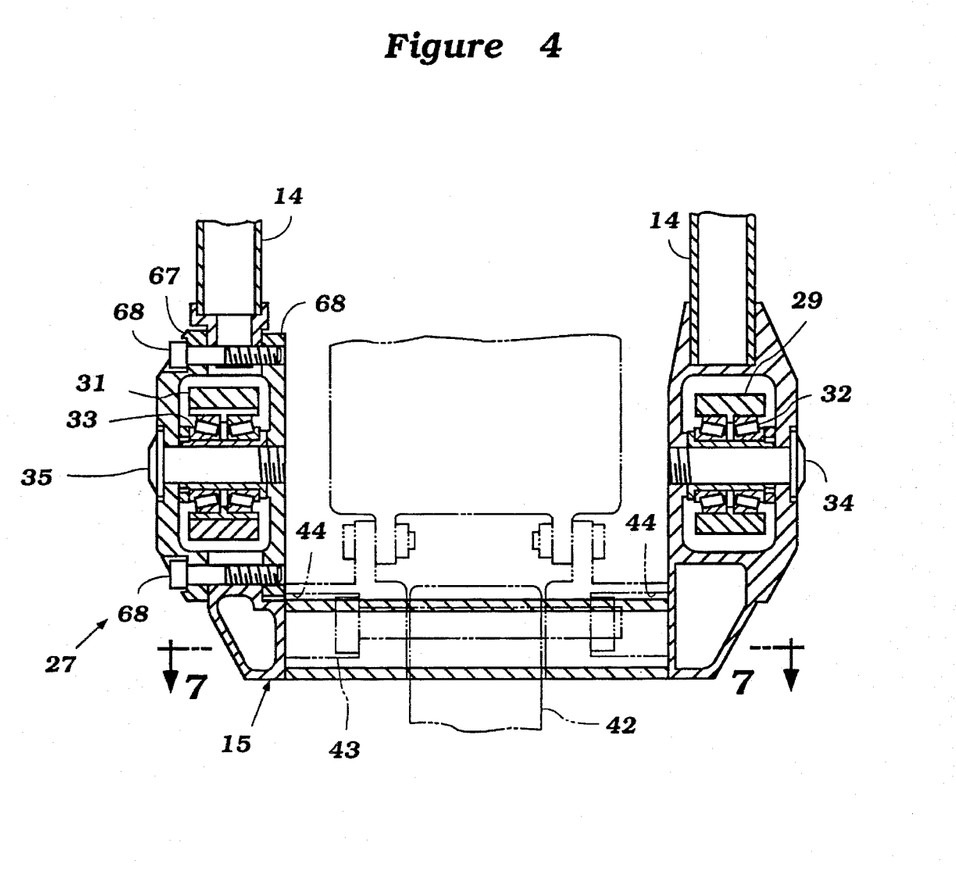
FIG. 4 is a cross sectional view taken along the line 4—4 of FIG. 3.

The suspension for the rear wheel 22 is indicated generally by the reference numeral 27 and is shown in most detail in the remaining figures. The suspension system 27 includes a fabricated trailing arm, indicated generally by the reference numeral 28 and which may be formed from a light weight material such as aluminum or aluminum alloy. This trailing arm 28 has a generally H shape in top plane view (FIG. 2) and is comprised of a pair of forwardly extending arms 29 and 31 which carry bearings 32 and 33 to provide a pivotal connection to the fabrication 15 by means of a pair of pivot bolts 34 and 35. It should be noted that the pivot bolts 34 and 35 lie substantially along the center line 16 of the main frame members 14 so as to provide a high strength for the assembly while still permitting a very light weight.

The suspension arm 28 also has a pair of rearwardly extending side legs 36 and 37 which extend along opposite sides of the rear wheel 22 and the rear wheel 22 is rotatably journaled therein in a suitable manner.

The rear wheel suspension 27 also includes a tubular type suspension element 38 which may comprise a combined shock absorber and spring assembly. This shock absorber and spring assembly 38 is connected by a pivot bolt 39 to a cross brace 41 that is affixed to the rear ends of the main frame members 14 and which spans them. It is the cylinder assembly of the suspension element 38 that has the pivotal connection 39 to the frame assembly 12.

Figure 7:
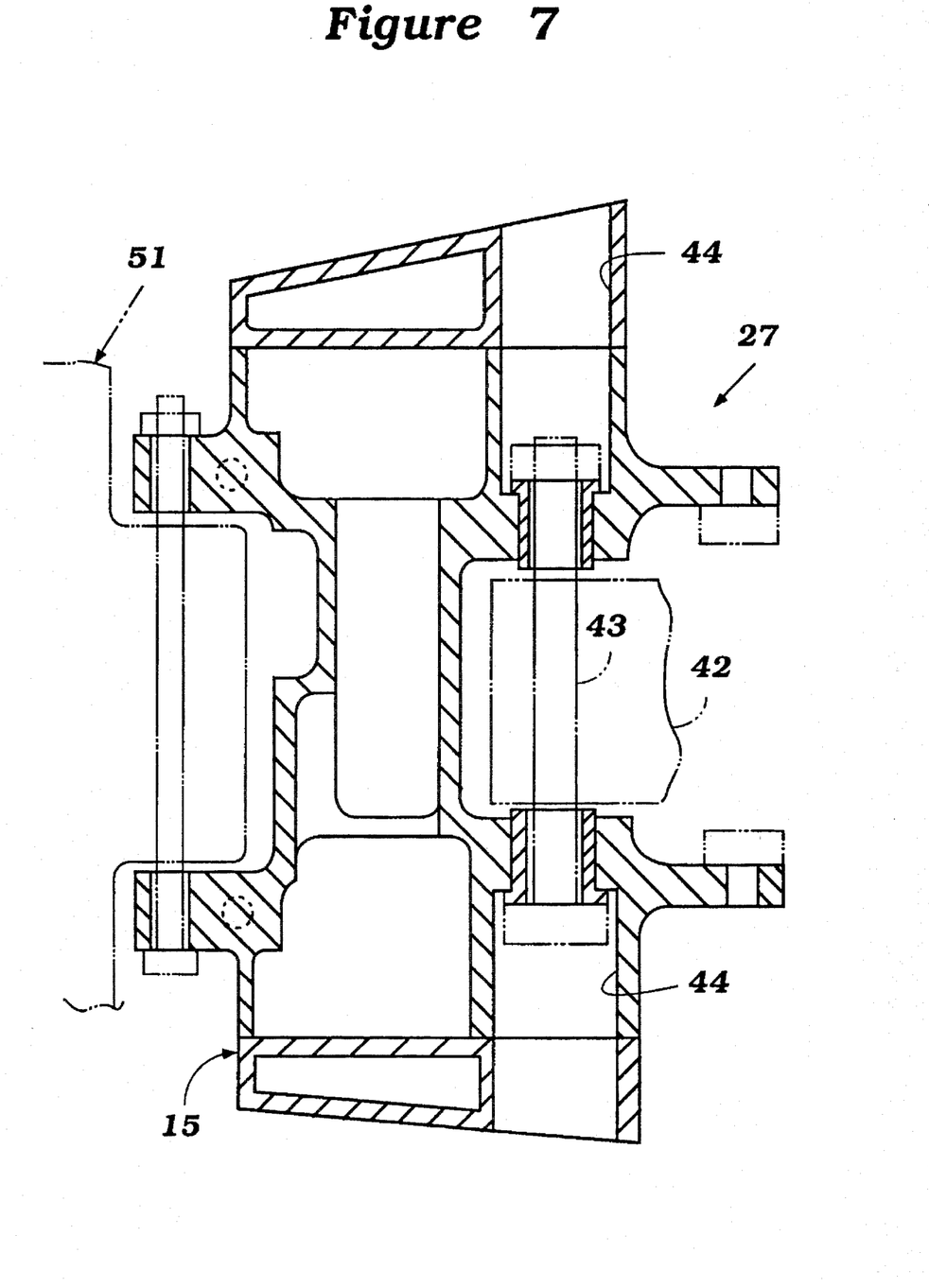
FIG. 7 is a cross sectional view taken along the line 7—7 of FIG. 4.

The piston element of the combined shock absorber and spring 38 is loaded by means of a linkage system that is comprised of a first link 42 that is pivotally connected at its forward end by a pivot bolt 43 to the fabrication 15. As may be best seen in FIG. 7, the fabrication has a pair of aligned openings 44 that pass the pivot bolt 43 and permit it to be conveniently fixed in place. The rear end of the arm 42 has a pivotal connection 45 to the piston rod 46 of the suspension element 38.

A second link 47 is pivotally connected by means of a pivot bolt 48 to the trailing arm 28. The opposite end of the link 47 is connected by a pivot bolt 49 to the link 42 for pivoting the link 42 and loading the suspension element 38 upon pivotal movement of the trailing arm 28 and suspension movement of the rear wheel 22. As may be noted in FIG. 2, the pivot bolt 48 is disposed at the cross of the H shape of the trailing arm 28 and also as may be seen in FIGS. 1, 3, 5 and 6, the trailing arm has a generally triangular shape with the pivot bolt 48 being located at its point of greatest height so as to provide a very rigid and yet light weight construction. As a result, the frame assembly will be extremely robust and, at the same time, light in weight.

Referring again primarily to FIG. 1, a power unit in the form of a combined internal combustion engine and crankcase positioned change speed transmission assembly, indicated generally by the reference numeral 51 is supported within the frame assembly 12 for driving the rear wheel 22. In the illustrated embodiment, the power unit 51 is a single cylinder, two cycle, crankcase compression, internal combustion engine having a forwardly inclined cylinder block 52 in which a single cylinder is provided. Of course, it is to be understood that the invention can be employed in conjunction with engines having other cylinder numbers or cylinder configurations and operating on other cycles.

However, in connection with an important feature of the invention, the power unit 51 has all of its major components, to be described, positioned on the rear side thereof and between the main frame members 14. This includes the exhaust system comprised of an exhaust pipe 53 that extends rearwardly from the exhaust port of the cylinder block 52 and which terminates at a muffler 54 for silencing and discharging the exhaust gases to the atmosphere. In addition, an induction system and charge former 55 are also positioned on the rear side of the power unit 51 and between the main frame members 14. Furthermore, the rear suspension element is positioned in this generally opened area so that these components will not only be protected from the rugged terrain over which the motorcycle 11 is driven but also will be easily accessible.

A pair of down tubes 56 extend downwardly from the main frame members 14 and carry a bottom plate 57 and a front cover 58 for protecting the power unit 51.

As has been noted, the power unit 51 includes a crankcase mounted change speed transmission, as is common with motorcycle practice. As may be best seen in FIG. 2, this change speed transmission includes an output shaft 59 that is journalled in a side bearing 61 of the power unit 51 and which has a sprocket 62 affixed to its exposed end. The sprocket 62 is disposed so that it is coaxial with the axis defined by the bearings 32 and 33. As a result of this, suspension movement will cause minimum chain length effects.

A chain 63 is trained around the sprocket 62 and a sprocket 64 that is affixed to the rear wheel 22 for driving the rear wheel 22 in a known manner. As may be seen from FIGS. 1, 2, 3 and 5, the chain 63 passes through an opening defined by the trailing arm 28 so as to permit the triangular shape for the trailing arm 28 as already described.

Because of the fact that the sprocket 62 is aligned with the pivot axis for the trailing arm 28, the use of such a location in conventional motorcycle constructions is difficult or, alternatively, the servicing of the sprocket 62 and chain 63 is extremely difficult. However, in accordance with a feature of the invention, the construction of the fabrication 15 and pivot connection between the trailing aim 28 and the fabrication 15 is such that servicing is facilitated. This construction may be best understood by reference to FIGS. 1 through 5.

As may be seen on the side of the trailing arm 28 adjacent the sprocket 62, the fabrication 15 does not form a complete enclosure for the trailing arm leg 31. Rather, the sides of the arm 31 are confined by a pair of readily detachable plates comprised of an inner plate 66 and an outer plate 67. The plates 66 and 67 are held to the fabrication 15 by means of a plurality of threaded fasteners 68 which pass through openings in one of the plates 66 and are tapped into threaded openings in the outer plate 67. The pivot bolt 35 may thus be removed and removal of the plates 66 and 67 then afford access to the bearing 33.

Figure 5:
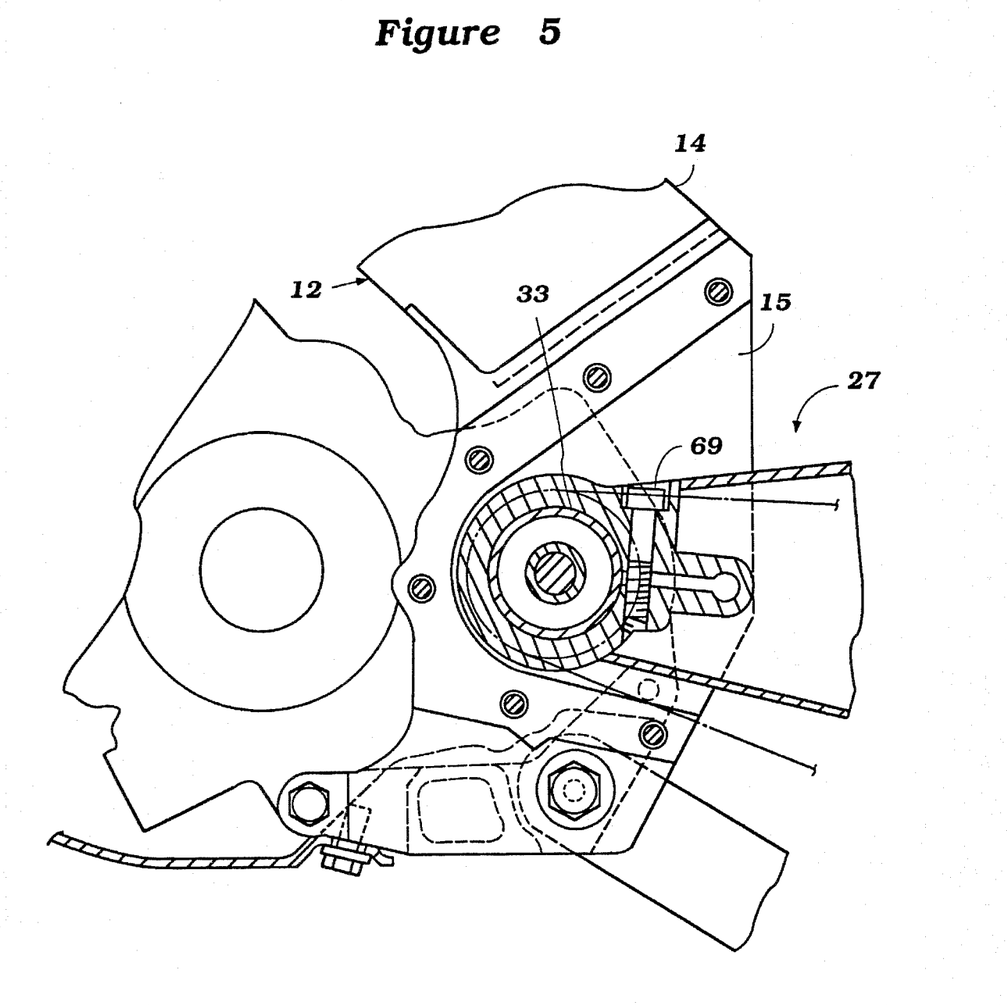
FIG. 5 is a further enlarged side elevational view of the area shown in FIG. 3, with a portion broken away so as to show the construction for the trailing arm pivot.
Figure 6:
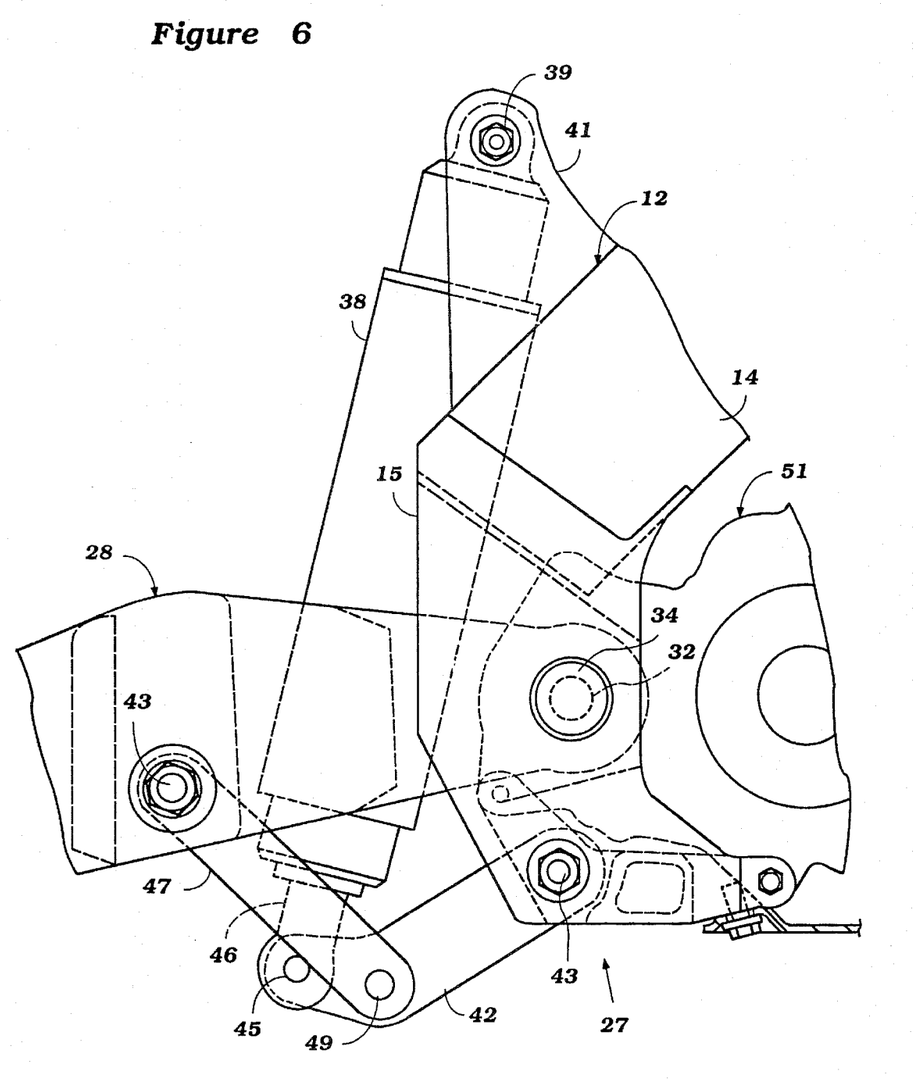
FIG. 6 is a side elevational view looking from the opposite side of FIG. 3.

The bearing 33 is held in place by means of a pinch bolt 69 as best shown in FIG. 5. By loosening the pinch bolt 65, the bearing 33 may be extracted through the outer side of the frame fabrication 15. It will be noted that the outer diameter of the bearing 33 is larger than the diameter of a bolt 71 that holds the sprocket 62 on the transmission output shaft 59. Therefore, once the bearing 33 is extracted, the bolt 71 may be removed and the sprocket 62 slid off of the shaft 59 to release the chain 63. The pivot bolt 34 at the opposite side of the fabrication 15 may then be easily removed and the trailing arm 28 and mounted rear wheel 22 may be easily slid rearwardly so as to access the remaining components. It should be readily apparent, therefore, that the described construction is extremely effective in providing a high strength, light weight motorcycle having a trailing arm rear wheel suspension and one in which the motorcycle components can be easily serviced. Of course, the foregoing description is that of a preferred embodiment of the invention and various changes and modifications may be made without departing from the spirit and scope of the invention, as defined by the appended claims.

I claim:

1. A motorcycle construction comprised of a frame assembly comprising a head pipe and a pair of main frame members fixed at their front ends to said head pipe, each of said main frame members extending generally downwardly and rearwardly from said head pipe in a direction longitudinally of said motorcycle in a line defining a respective center line inclined from the vertical and horizontal in a side elevation, a front fork rotatably journaling a front wheel and suspending said front wheel for suspension movement, said front wheel fork being dirigibly supported by said head pipe, at least one of said main frame members having means defining a pivot axis at its rear lower end lying substantially on said center lines both in side and in top views, a trailing arm having a front part lying on said center lines, nested within said one main frame member and pivotally journaled on said pivot axis, said trailing arm having a triangular configuration in side elevation, a suspension element carried by said frame assembly, a link pivotally connected to said trailing arm where said trailing arm has its greatest height in side elevation and to said suspension element for loading said suspension element upon pivotal movement of said trailing arm relative to said frame assembly, a rear wheel rotatably journaled by said trailing arm, a seat carried by said main frame members, a power means for driving said rear wheel suspended from said main frame members including a flexible transmitter driven by a driving sprocket positioned inboard of said trailing arm front part and rotatable about an axis of rotation substantially parallel to said pivot axis, and means for accessing said driving sprocket through the trailing arm front part for removal of said driving sprocket and said flexible transmitter.

2. A motorcycle construction as set forth in claim 1 wherein the flexible transmitter passes through the trailing arm.

3. A motorcycle construction as set forth in claim 1 wherein the power unit comprises an internal combustion engine having its induction system and its exhaust system extending rearwardly.

4. A motorcycle construction as set forth in claim 3 wherein the engine exhaust system and induction system is positioned between the main frame members.

5. A motorcycle construction as set forth in claim 1 wherein the pivot means includes a bearing removably contained within the forward end of the trailing arm outboard of the sprocket and having a diameter larger than the diameter of a fastener holding the driving sprocket in place for removal of said fastener by pulling of the bearing.

6. A motorcycle construction as set forth in claim 1 wherein the flexible transmitter passes through the trailing arm.

7. A motorcycle construction comprised of a frame assembly comprising a head pipe and a pair of main frame members journalled at their front ends to said head pipe and extending generally downwardly and rearwardly from said head pipe in a direction longitudinally of said motorcycle in a line defining a center line inclined from the vertical and horizontal in side elevation, a front fork rotatably journaling a front wheel and dirigibly supported by said head pipe, said main frame members having means defining a pivot axis at their rear lower ends lying substantially on said center line both in side and top views, a trailing arm pivotally journalled on said pivot axis, a rear wheel rotatably journalled by said trailing arm, power means mounted in said frame assembly including a flexible transmitter driven by a driving sprocket having its axis of rotation substantially parallel to but spaced from the pivot axis for driving said rear wheel, and driving sprocket being positioned inboard of said frame and said trailing arm, a fastener for affixing said driving sprocket to a shaft of said power means, and detachable means closing an opening on said trailing arm for accessing said fastener and said driving sprocket through a side of the trailing arm forward end upon removal of said detachable means for removal of said fastener through said opening for removal of said sprocket and said flexible transmitter from said motorcycle prior to removal of the remainder of said trailing arm.

8. A motorcycle construction as set forth in claim 7 wherein the detachable means includes a bearing comprising the pivot means and removably contained with the opening at the forward end of the trailing arm outboard of the sprocket and having a diameter larger than the diameter of the fastener holding the driving sprocket in place for removal of said fastener through the side of the trailing arm by pulling of the bearing.

9. A motorcycle construction as set forth in claim 7 wherein the trailing arm has a generally triangular configuration in side elevation view and a generally H shape in top plan view.

10. A motorcycle construction as set forth in claim 9 further including a pivot connection at the highest part of the trailing arm in side elevation for loading a suspension element.

11. A motorcycle construction as set forth in claim 9 the detachable means includes a bearing comprising the pivot means and removably contained within the forward end of the trailing arm outboard of the sprocket and having a diameter larger than the diameter of the fastener holding the sprocket in place for removal of said fastener through the side of the trailing arm by pulling of the bearing.

\* \* \* \* \*